(12) United States Patent
Suzuki

(10) Patent No.: US 11,366,412 B2
(45) Date of Patent: Jun. 21, 2022

(54) IMAGE FORMING APPARATUS, DECOLORATION DEVICE AND DECOLORATION METHOD

(71) Applicant: TOSHIBA TEC KABUSHIKI KAISHA, Tokyo (JP)

(72) Inventor: Katsunori Suzuki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 17/030,414

(22) Filed: Sep. 24, 2020

(65) Prior Publication Data

US 2021/0247708 A1    Aug. 12, 2021

(30) Foreign Application Priority Data

Feb. 6, 2020   (JP) .............................. JP2020-019187

(51) Int. Cl.
  *G03G 15/20*   (2006.01)
  *G06K 19/07*   (2006.01)
  *G06K 17/00*   (2006.01)
  *G03G 15/00*   (2006.01)

(52) U.S. Cl.
  CPC ....... *G03G 15/2003* (2013.01); *G03G 15/205* (2013.01); *G03G 15/507* (2013.01); *G03G 15/5066* (2013.01); *G06K 17/0025* (2013.01); *G06K 19/0717* (2013.01)

(58) Field of Classification Search
  CPC ............. G03G 15/2003; G03G 15/205; G03G 15/5066; G03G 15/507; G06K 19/0717
  See application file for complete search history.

(56) References Cited

U.S. PATENT DOCUMENTS

| 2013/0293931 | A1* | 11/2013 | Yasunaga | G03G 15/5029 358/3.28 |
| 2015/0338800 | A1* | 11/2015 | Ueno | G03G 15/2039 399/69 |
| 2016/0070213 | A1* | 3/2016 | Arima | G03G 15/6585 399/69 |

FOREIGN PATENT DOCUMENTS

| JP | 2020-231544 | 10/2010 |
| JP | 2011-076362 | 4/2011 |

* cited by examiner

*Primary Examiner* — Joseph S Wong
(74) *Attorney, Agent, or Firm* — Amin, Turocy & Watson, LLP

(57) ABSTRACT

According to one embodiment, an image forming apparatus includes a reading unit, a heating unit, and an updating unit. The reading unit reads area designation information for designating an area to be decolored in areas of a sheet on which an image that can be decolored by heating is formed and history information for indicating the number of times of performing decoloration in the past for each area of the sheet from a wireless tag attached to the sheet. The heating unit heats the area based on the area designation information read by the reading unit. The updating unit updates the history information stored in the wireless tag which corresponds to the area heated by the heating unit.

20 Claims, 13 Drawing Sheets

FIG. 8

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 | 0 |
| 4 | 0 | 0 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| 5 | 0 | 0 | 1 | 1 | 1 | 1 | 1 | 1 | 0 | 0 | 0 | 1 | 1 | 0 | 0 | 0 | 0 | 0 | 0 | 0 | 0 | 0 | 0 | 0 |
| 6 | 0 | 0 | 1 | 1 | 0 | 0 | 0 | 1 | 1 | 0 | 0 | 1 | 1 | 0 | 0 | 0 | 0 | 0 | 0 | 0 | 0 | 0 | 0 | 0 |
| 7 | 0 | 0 | 0 | 1 | 1 | 1 | 0 | 0 | 0 | 0 | 0 | 1 | 1 | 1 | 0 | 0 | 0 | 0 | 0 | 1 | 1 | 1 | 0 | 0 |
| 8 | 0 | 0 | 0 | 1 | 1 | 1 | 0 | 0 | 0 | 0 | 0 | 0 | 0 | 0 | 0 | 0 | 0 | 0 | 0 | 1 | 1 | 1 | 0 | 0 |
| 9 | 0 | 0 | 0 | 1 | 1 | 1 | 0 | 0 | 0 | 0 | 0 | 0 | 0 | 0 | 0 | 0 | 0 | 0 | 0 | 1 | 1 | 1 | 0 | 0 |

FIG. 12

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 3 | 0 | 0 | 0 | 1 | 1 | 1 | 1 | 0 | 0 | 0 | 0 | 1 | 1 | 1 | 0 | 0 | 0 | 1 | 1 | 0 | 0 | 0 | 0 | 0 |
| 4 | 0 | 0 | 1 | 1 | 1 | 1 | 1 | 1 | 0 | 0 | 0 | 1 | 1 | 0 | 0 | 0 | 0 | 1 | 1 | 1 | 0 | 0 | 0 | 0 |
| 5 | 0 | 0 | 1 | 1 | 2 | 1 | 1 | 0 | 0 | 0 | 0 | 1 | 1 | 0 | 0 | 0 | 0 | 1 | 1 | 1 | 0 | 0 | 0 | 0 |
| 6 | 0 | 0 | 1 | 2 | 1 | 1 | 1 | 0 | 0 | 0 | 0 | 1 | 1 | 1 | 0 | 0 | 0 | 1 | 0 | 0 | 1 | 1 | 0 | 0 |
| 7 | 0 | 0 | 0 | 1 | 2 | 1 | 1 | 0 | 1 | 1 | 1 | 0 | 0 | 0 | 0 | 0 | 0 | 0 | 0 | 1 | 1 | 1 | 0 | 0 |
| 8 | 0 | 0 | 0 | 1 | 2 | 2 | 1 | 0 | 1 | 1 | 1 | 0 | 0 | 0 | 0 | 0 | 0 | 0 | 0 | 1 | 1 | 1 | 0 | 0 |
| 9 | 0 | 0 | 0 | 1 | 1 | 2 | 1 | 1 | 1 | 1 | 1 | 0 | 0 | 0 | 0 | 0 | 0 | 0 | 0 | 1 | 1 | 1 | 0 | 0 |

IMAGE FORMING APPARATUS, DECOLORATION DEVICE AND DECOLORATION METHOD

CROSS-REFERENCE TO RELATED APPLICATION

This application is based upon and claims the benefit of priority from Japanese Patent Application No. 2020-019187, filed Feb. 6, 2020, the entire contents of which are incorporated herein by reference.

FIELD

Embodiments described herein relate generally to an image forming apparatus, a decoloration device, and a decoloration method.

BACKGROUND

There is an image forming apparatus that forms an image on a sheet (hereinafter, referred to as a "tag sheet") to which a wireless tag is attached and writes information (hereinafter, referred to as "tag information") relating to the formed image to a wireless tag. The wireless tag is, for example, a radio frequency (RF) tag. There is an image forming apparatus that not only can form a decolorable image on a sheet but also can decolor a formed image. The decolorable image is formed with a recording material (for example, a decolorable toner) or the like, for example, that is decolored by heating. However, in the related art, it is required that the decoloration of an image and an update of the tag information are performed by using independent devices. Therefore, it is difficult to perform the decoloration and the update in a series of operations, and the effort of a user increases. A risk of erroneously associating image formed on the tag sheet and the tag information with each other may easily occur.

DESCRIPTION OF THE DRAWINGS

FIG. 8 is a schematic view illustrating an update of history information by the image forming apparatus;

FIG. 12 is a schematic view illustrating an update of history information by the image forming apparatus.

DETAILED DESCRIPTION

An object to be achieved by the embodiment is to provide an image forming apparatus, a decoloration device, and a decoloration method in which the consistency between the image formed on the tag sheet and the tag information can be easily increased.

In general, according to one embodiment, an image forming apparatus includes a reading unit, a heating unit, and an updating unit. The reading unit reads area designation information for designating an area to be decolored in areas of a sheet on which an image that can be decolored by heating is formed and history information for indicating the number of times of performing the decoloration in the past for each area of the sheet from a wireless tag attached to the sheet. The heating unit heats the area based on the area designation information read by the reading unit. The updating unit updates the history information stored in the wireless tag which corresponds to the area heated by the heating unit.

In an image forming apparatus, a decoloration device, and a decoloration method according to the embodiment, the consistency between an image formed on a tag sheet and tag information can be easily increased. Hereinafter, the image forming apparatus, the decoloration device, and the decoloration method are specifically described.

First, the overall configuration of an image forming apparatus 100 of the embodiment is described with reference to FIG. 1.

Figure 1:
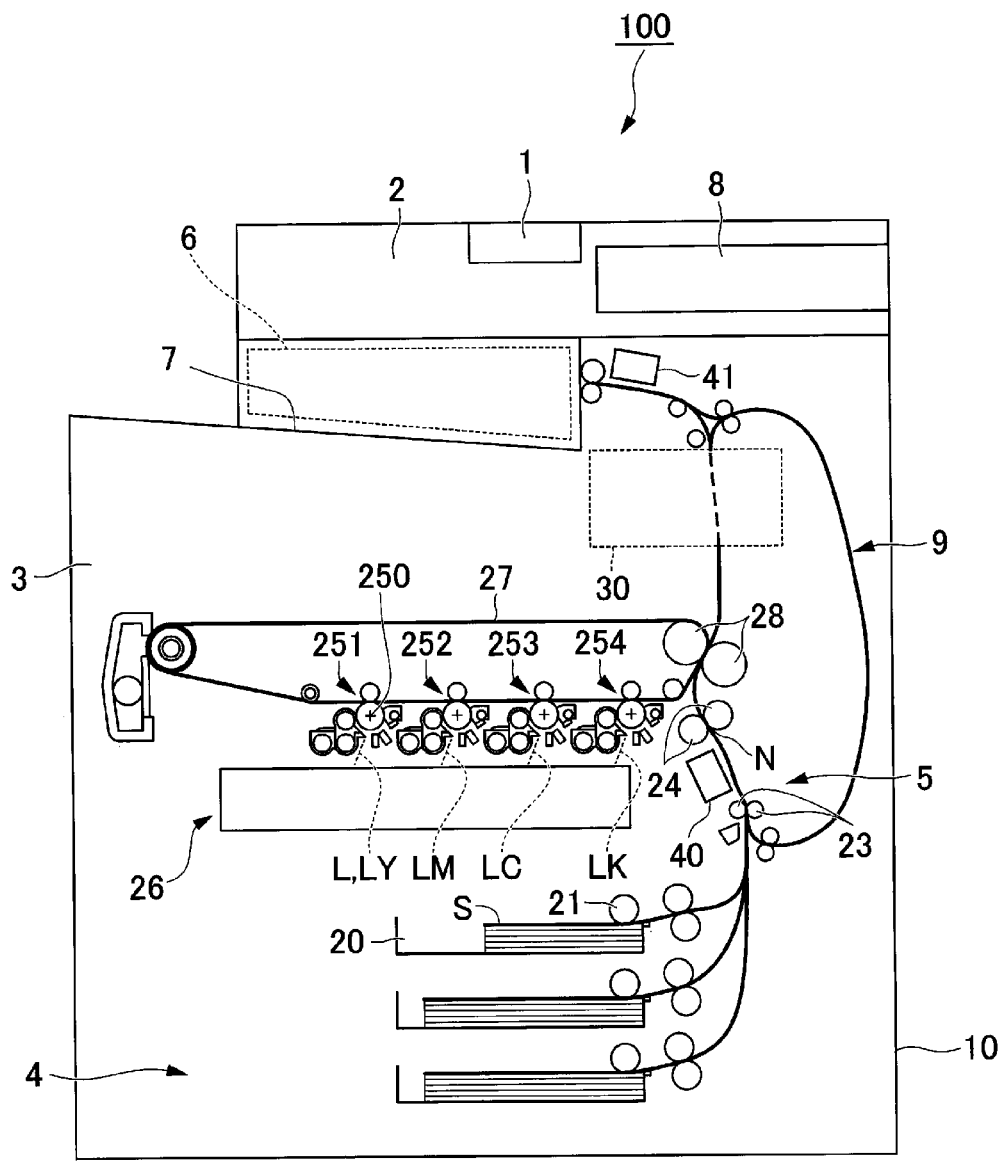
FIG. 1 is a schematic diagram of a configuration of an image forming apparatus of an embodiment.

FIG. 1 is a schematic diagram of a configuration of the image forming apparatus 100 of the embodiment. The image forming apparatus 100 is, for example, a multifunction peripheral (MFP).

The image forming apparatus 100 forms an image on a sheet S, for example, by using a recording material such as a toner and a decolorable toner. The image forming apparatus 100 decolors an image formed on the sheet S, for example, by a recording material such as a decolorable toner. The sheet S is, for example, paper or label paper. Here, anything may be used as the sheet S, as long as the image forming apparatus 100 can form an image on the front surface thereof. The image forming apparatus 100 may be an image forming apparatus using a method of fixing a toner image on the sheet S and may be an image forming apparatus using an ink jet method.

The image forming apparatus 100 include a display 1, a scanner unit 2, a printer unit 3, a sheet supplying unit 4, a conveyance unit 5, a controller 6, a paper discharging tray 7, a control panel 8, a reversing unit 9, and a housing 10.

For example, the display 1 is an image display device such as a liquid crystal display (LCD) and an organic electro luminescence (EL) display. The display 1 displays various kinds of information relating to the image forming apparatus 100. The display 1 displays, for example, an operation mode of the image forming apparatus 100 selected by a user. The operation mode includes a general operation mode that performs a general image forming operation and a decoloration mode performing a decoloration operation of decoloring a decolorable toner on the sheet S.

Examples of the general operation mode include a mode of performing general operations by the image forming apparatus such as copying, FAX, and scanning. Examples of the general operation mode may include an operation mode of forming an image with a general toner (non-decolorable toner) and an operation mode of forming an image with a decolorable toner. In the decoloration mode, the image forming apparatus 100 functions as a decoloration device performing a decoloration process on the image formed on the sheet S.

The display 1 displays these operation modes. The user designates an operation mode of the image forming apparatus 100 by performing an operation input of pressing an input button or the like included in the control panel 8. Otherwise, the user may designate an operation mode of the image forming apparatus 100 by performing an operation input of tapping an icon or the like displayed in a touch panel, for example, including the display 1 and the control panel 8.

The scanner unit 2 reads image to be read based on brightness and darkness of light. The scanner unit 2 generates and records the image information indicating the read image. The scanner unit 2 outputs the generated image information to the printer unit 3. The recorded image information may be transmitted to an external device or the like via a network.

The printer unit 3 forms an output image (hereinafter, also referred to as a "toner image") with a recording material such as a toner based on the image information obtained from the scanner unit 2 or the external device. The printer unit 3 transfers the toner image on the front surface of the sheet S. The printer unit 3 heats and presses the toner image on the front surface of the sheet S to fix the toner image on the sheet S. The sheet S may be a sheet supplied by the sheet supplying unit 4 or may be a manually fed sheet.

The printer unit 3 includes a plurality of image forming units 25, a laser deflecting unit 26, an intermediate transferring belt 27, a transferring unit 28, and a fixing device 30.

The image forming unit 25 includes a photosensitive drum 250. The image forming unit 25 forms the toner image corresponding to the image information obtained from the scanner unit 2 or the external device to the photosensitive drums 250. The plurality of image forming units (an image forming unit 251, an image forming unit 252, an image forming unit 253, and an image forming unit 254) form toner images with yellow, magenta, cyan, and black, respectively.

A charger (not illustrated), a developing device (not illustrated), and the like are arranged around the photosensitive drum 250. The charger charges the front surface of the photosensitive drum 250. The developing device contains a recording material including yellow, magenta, cyan, and black toners. The developing device develops the electrostatic latent image on the photosensitive drum 250. As a result, a toner image with a toner of a color is formed on the photosensitive drum 250.

The laser deflecting unit 26 deflects laser light L on the charged photosensitive drums 250 to expose the photosensitive drums 250. The laser deflecting unit 26 exposes the photosensitive drums 250 of image forming unit (the image forming unit 251, the image forming unit 252, the image forming unit 253, and the image forming unit 254) of the colors with a corresponding laser light (a laser light LY, a laser light LM, a laser light LC, and a laser light LK). Accordingly, the laser deflecting unit 26 forms electrostatic latent images on the photosensitive drums 250.

The toner image on the front surface of the photosensitive drum 250 is primarily transferred to the intermediate transferring belt 27.

The transferring unit 28 transfers the toner image primarily transferred to the intermediate transferring belt 27 to the front surface of the sheet S at a secondary transfer position.

The fixing device 30 heats the toner image transferred to the sheet S with a heater 59 described below and presses the toner image with a pressure roller 58 described below to fix the toner image.

The printer unit 3 can perform not only the image forming process but also the image decoloration process. The printer unit 3 decolors the image formed on the sheet S by the recording material such as a decolorable toner that can be decolored by heating. The printer unit 3 heats the sheet S for decoloration. The heating is performed, for example, by the fixing device 30 of the printer unit 3. The fixing device 30 decolors the sheet S by heating at a temperature higher than the temperature when the image forming process is performed. For example, a fixing belt 57 of the fixing device 30 is heated by the heater 59 at 100° C. when the image forming process is performed. For example, the fixing belt 57 of the fixing device 30 is heated by the heater 59 at 130° C. when the image decoloration process is performed.

The sheet supplying unit 4 supplies the sheets S to the conveyance unit 5 one by one at the timing when the printer unit 3 forms the toner image. The sheet supplying unit 4 includes a sheet storage unit 20 and a pickup roller 21. The sheet storage unit 20 stores the sheets S of a predetermined size and a predetermined type. The pickup roller 21 extracts the sheets S from the sheet storage unit 20 one by one. The pickup roller 21 supplies the extracted sheets S to the conveyance unit 5.

The conveyance unit 5 conveys the sheet S supplied from the sheet supplying unit 4 to the printer unit 3. The conveyance unit 5 includes a conveyance roller 23 and a registration roller 24. The conveyance roller 23 conveys the sheet S supplied from the pickup roller 21 to the registration roller 24. The conveyance roller 23 abuts the leading end of the sheet S in the conveyance direction to a nip N of the registration roller 24. The registration roller 24 adjusts the position of the leading end of the sheet S in the conveyance direction so that the sheet S is bent at the nip N. The registration roller 24 conveys the sheet S at the timing when the printer unit 3 transfers the toner image to the sheet S.

The conveyance unit 5 includes a first read and write unit 40 and a second read and write unit 41.

The first read and write unit 40 and the second read and write unit 41 detect radio waves transmitted from a wireless tag T attached to the sheet S conveyed by the conveyance unit 5. The first read and write unit 40 and the second read and write unit 41 read and write the information stored in the wireless tag T. The first read and write unit 40 and the second read and write unit 41 are, for example, a RFID reader and writer.

The first read and write unit 40 is provided at a position to be an entrance of the conveyance unit 5. As illustrated in FIG. 1, the first read and write unit 40 is provided at a position where the sheet S is supplied from the sheet supplying unit 4 (for example, a portion between the conveyance roller 23 and the registration roller 24).

The second read and write unit 41 is provided at a position to be an exit of the conveyance unit 5. As illustrated in FIG. 1, the second read and write unit 41 is provided at a position where a sheet is discharged to the paper discharging tray 7 (for example, a portion between the paper discharging tray 7 and the reversing unit 9).

The controller 6 controls operations of functional units included in the image forming apparatus 100.

The paper discharging tray 7 is mounted with the sheet S discharged from the conveyance unit 5 after the image is formed or decolored.

The control panel 8 includes a plurality of input buttons. The control panel 8 receives an operation input by the user. The control panel 8 outputs a signal corresponding to the operation input performed by the user to the controller 6 of the image forming apparatus 100.

The display 1 and the control panel 8 may be configured as an integrated touch panel.

The reversing unit 9 reverses the sheet S on which the image is formed to the back surface of the sheet S. The reversing unit 9 reverses the front and back of the sheet S discharged from the fixing device 30 by switchback. The reversing unit 9 conveys the reversed sheet S to the registration roller 24.

The housing 10 forms the outer shape of the image forming apparatus 100.

Subsequently, with reference to FIG. 2, the hardware configuration of the image forming apparatus 100 is described.

Figure 2:
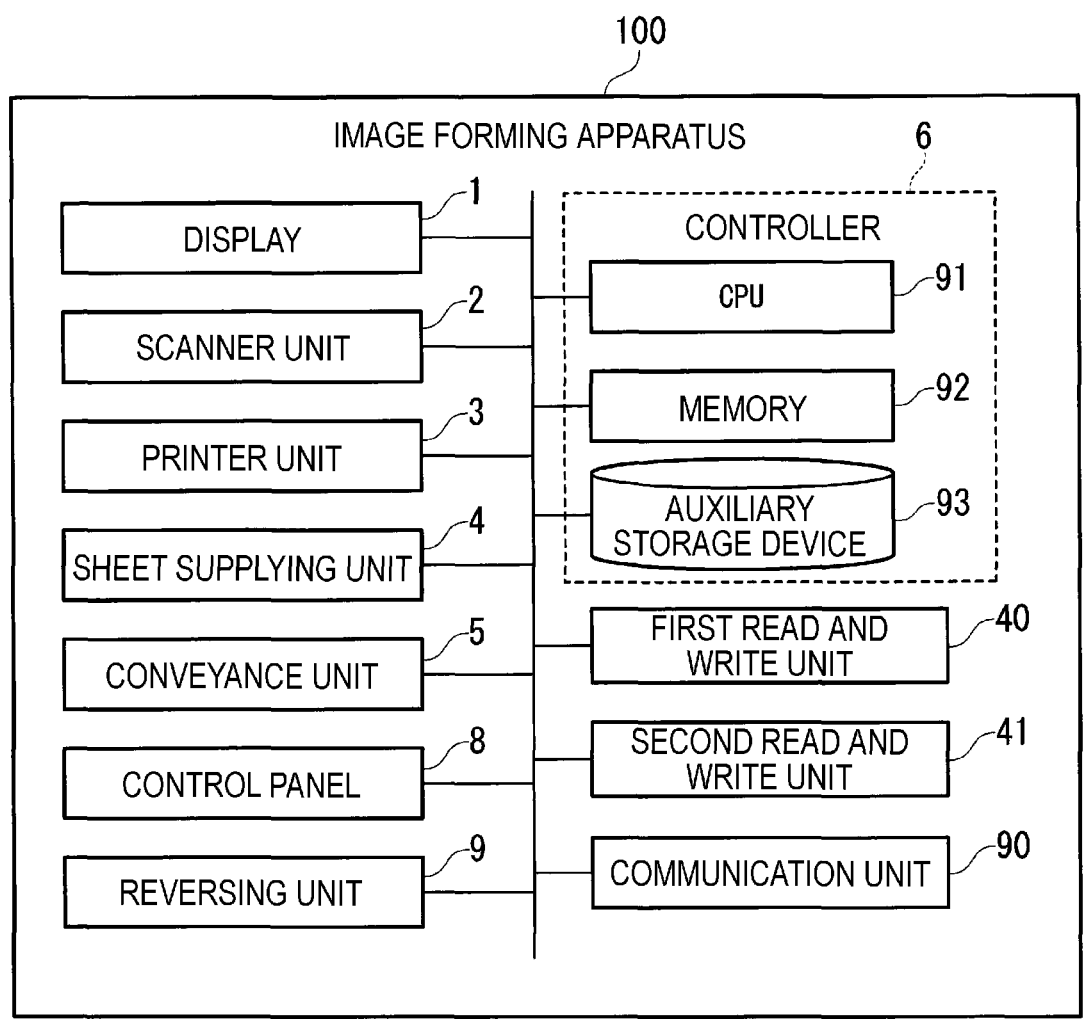
FIG. 2 is a diagram illustrating a hardware configuration of the image forming apparatus.

FIG. 2 is a diagram illustrating a hardware configuration of the image forming apparatus 100 of the embodiment.

The image forming apparatus 100 includes the display 1, the scanner unit 2, the printer unit 3, the sheet supplying unit 4, the conveyance unit 5, the controller 6, the control panel 8, the reversing unit 9, the first read and write unit 40, the second read and write unit 41, and a communication unit 90. The functional units are connected to each other via buses.

The controller 6 includes a central processing unit (CPU) 91, a memory 92, and an auxiliary storage device 93. Instead of the CPU 91, other processors may be used. The CPU 91 reads a program, for example, stored in the auxiliary storage device 93 and loads the program on the memory 92. The CPU 91 executes the program loaded on the memory 92 by causing the image forming apparatus 100 to function as a device including the display 1, the scanner unit 2, the printer unit 3, the sheet supplying unit 4, the conveyance unit 5, the control panel 8, the reversing unit 9, the first read and write unit 40, the second read and write unit 41, and the communication unit 90.

The memory 92 and the auxiliary storage device 93 are configured to include various storage media. The memory 92 and the auxiliary storage device 93 may be configured by an integrated storage medium.

The memory 92 temporarily stores data and programs used by the functional units included in the image forming apparatus 100. The memory 92 is configured, for example, to include a storage medium such as a random access memory (RAM).

The auxiliary storage device 93 stores the data and programs used by functional units included in the image forming apparatus 100. The auxiliary storage device 93 is configured, for example, to include a hard disk drive (HDD), a solid state drive (SSD), a read only memory (ROM), or a combination of these storage media.

The communication unit 90 is a communication interface for connecting the image forming apparatus 100 to an external device for communication.

Subsequently, the fixing device 30 is specifically described.

Figure 3:
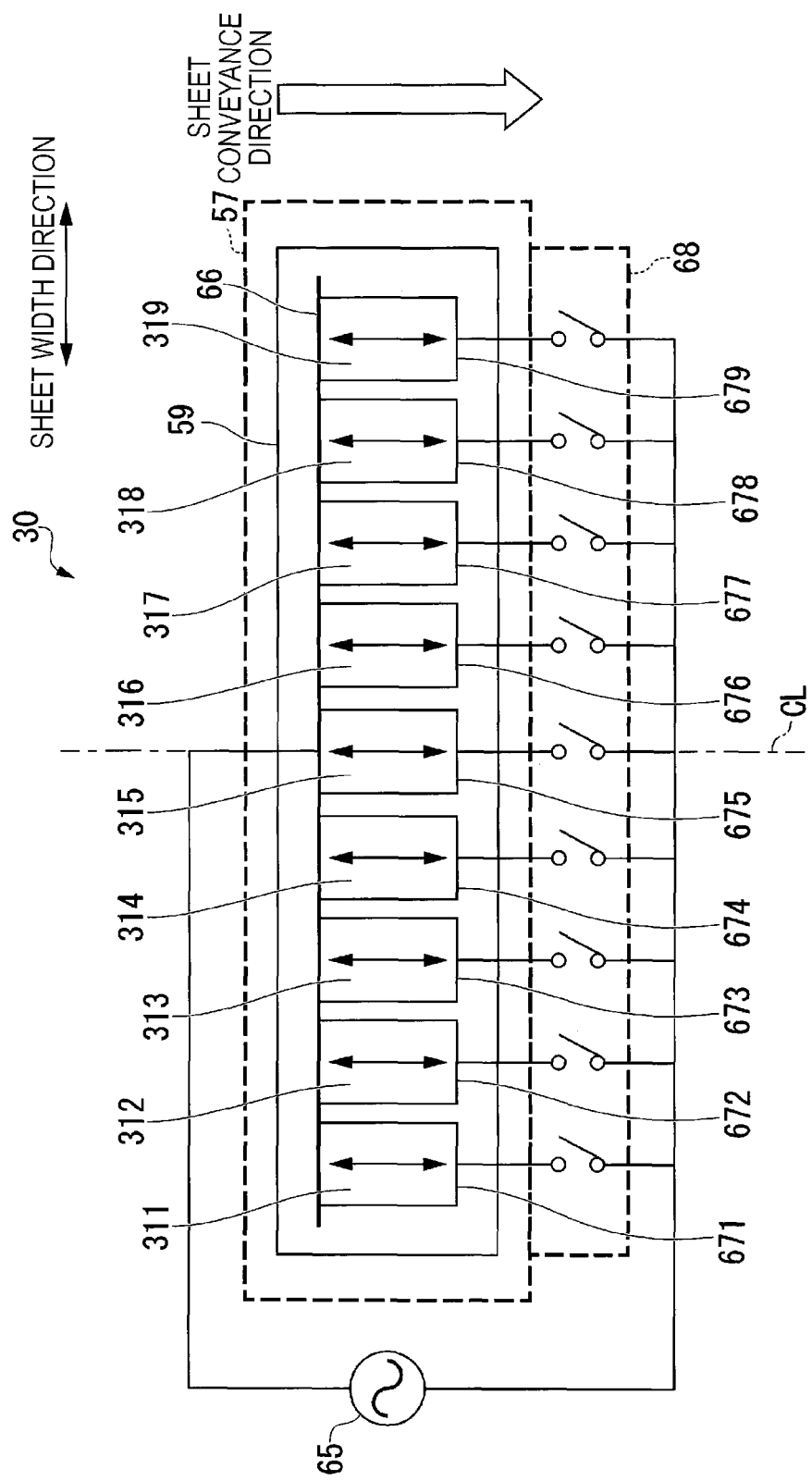
FIG. 3 is a schematic diagram illustrating a configuration example of a fixing device of the embodiment.

FIG. 3 is a schematic diagram illustrating a configuration example of the fixing device 30 of the embodiment. FIG. 3 illustrates the disposition of the heat source block group 31 (heat source blocks 311 to 319) described below and a state of the connection of the heat source blocks 311 to 319 with drive circuits thereof.

Figure 4:
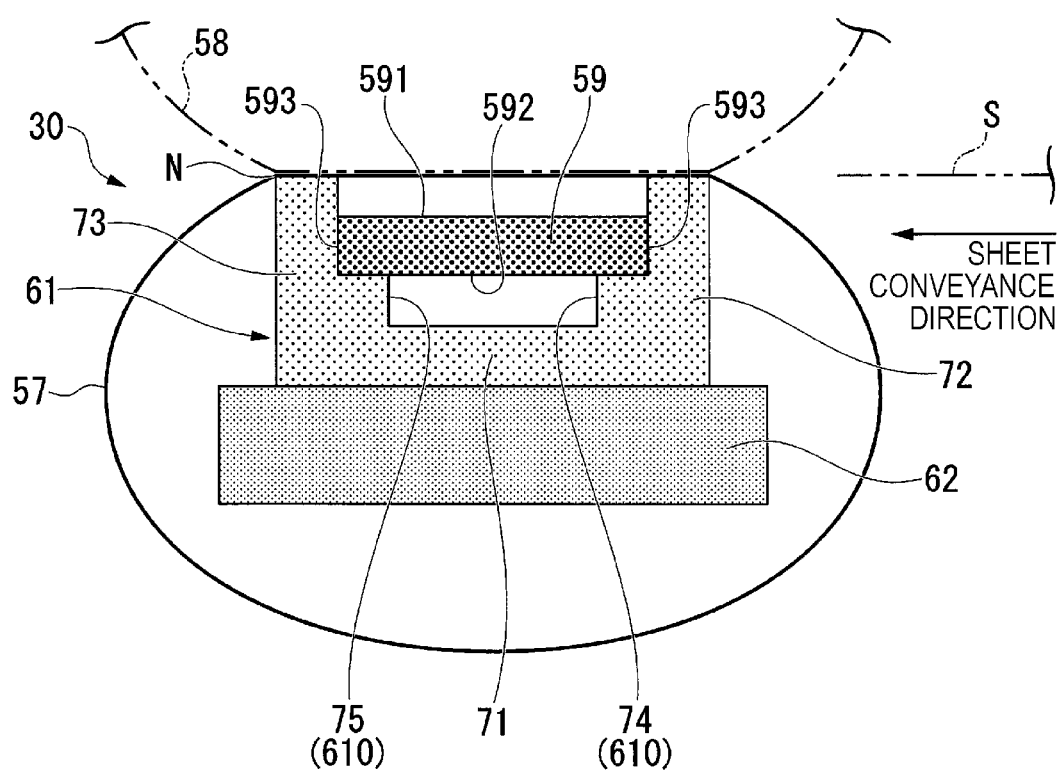
FIG. 4 is a diagram of a cross section that intersects the longitudinal direction of a heater in the fixing device.

FIG. 4 is a diagram of a cross section that intersects (perpendicular to) the longitudinal direction of the heater in the fixing device 30 of the embodiment. FIG. 4 illustrates a cross section of a holder 61 described below.

As illustrated in FIGS. 3 and 4, the fixing device 30 of the embodiment includes the fixing belt 57, the pressure roller 58, and the heater 59.

The fixing belt 57 is formed of a flexible material in a thin cylindrical shape. The fixing belt 57 is an endless belt-like member (including a film-like member). The fixing belt 57 includes a cylindrical base material (not illustrated) and a release layer (not illustrated) disposed on the outer peripheral surface of the base material. An elastic layer formed of material such as rubber may be interposed between the base material and the release layer.

Support members (not illustrated) are fitted into both end portions of the fixing belt 57 in the axial direction. The support members support the fixing belt 57 by causing cylindrical portions to be inserted into the end portions of the fixing belt 57 in the axial direction. The support members maintain the shape of both ends of the fixing belt 57 in the axial direction. Meanwhile, the support members are not fitted into each other, and thus the intermediate portion of the fixing belt 57 in the axial direction is easily deformed. The fixing belt 57 can rotate about the axis of the fixing belt 57 in a state of being supported by the support member.

For example, the fixing belt 57 and the pressure roller 58 are disposed along the horizontal plane. The pressure roller 58 is pressed to the fixing belt 57 side by a pressing unit (not illustrated) and is brought into contact with the outer peripheral surface of the fixing belt 57. When the surface layer of the pressure roller 58 and the fixing belt 57 compress each other, the nip N is formed at a portion that is pressed against by the pressure roller 58 and the fixing belt 57. At the nip N, the sheet S is interposed between the pressure roller 58 and the fixing belt 57.

The pressure roller 58 is rotationally driven by a drive source such as a motor (not illustrated) provided in the housing 10. If the pressure roller 58 is rotationally driven, the driving force of the pressure roller 58 is transferred to the fixing belt 57 at the nip N so that the fixing belt 57 is driven to rotate. The sheet S interposed at the nip N is conveyed to the downstream side in the conveyance direction by the rotation of the pressure roller 58 and the fixing belt 57. Here, the toner image transferred to the sheet S is fixed to the sheet S by the heat of the fixing belt 57. The image formed on the sheet S with a recording material such as a decolorable toner is decolored by the heat of the fixing belt 57.

The heater 59 is disposed on the inner peripheral side of the fixing belt 57 and extends in the sheet width direction toward (parallel to) the longitudinal direction. The heater 59 has at least a length equal to or longer than the entire width of the sheet S having the maximum width that can pass through the fixing device 30. The fixing belt 57 has at least a width equal to or longer than the length of the heater 59. The fixing belt 57 is heated in area facing the heater 59.

The heater 59 has a strip plate shape extending in the longitudinal direction. The heater 59 is disposed to face one of the front and back side surfaces on the inner peripheral surface of the fixing belt 57 (upper surface of FIG. 4). The heater 59 is output-controlled by a power source (not illustrated) provided in the housing 10 to generate heat and heats the fixing belt 57. The heater 59 is maintained in the holder 61 extending in the longitudinal direction of the heater 59.

As illustrated in FIGS. 3 and 4, the fixing device 30 of the embodiment heats the fixing belt 57 by a split heater method. The heat source block group 31 divided into a plurality of (for example, nine) blocks (the heat source blocks 311 to 319) (heating unit) is provided in a direction perpendicular to the sheet conveyance direction (sheet width direction) on the matrix of the heater 59 (for example, a ceramic-based heater substrate).

The fixing device 30 can align the sheet width direction of the sheet S so that the center portion of the sheet S in the width direction is overlapped with the center portion of the heater 59 in the longitudinal direction (indicated by a line CL in the drawing). That is, the fixing device 30 can convey the sheet S in a state in which the center portion of the sheet S in the width direction and the center portion CL of the heater 59 in the longitudinal direction are matched. Otherwise, the fixing device 30 can align (side-align) the sheet width direction of the sheet S with reference to one side in the sheet width direction. Otherwise, the fixing device 30 can align the sheet width direction of the sheet S at any position in the sheet width direction.

The heat source blocks 311 to 319 respectively include an input side electrode (common electrode) 66 and output side electrodes (individual electrode) 671 to 679 that apply alternating currents from an alternating current power source 65. Switching elements of a drive IC 68 are respectively connected to the output side electrodes 671 to 679. The energization to the heat source blocks 311 to 319 is individually controlled by the drive IC 68. Accordingly, the heat source blocks 311 to 319 can be configured so that the temperature can be individually controlled.

For example, the input side electrode is disposed on the upstream side of the sheet conveyance direction in the heater 59. The output side electrode is disposed in the heater 59 on the downstream side of the sheet conveyance direction. In FIG. 3, the common electrode (input side electrode) is disposed on the upstream side, but the common electrode may be disposed on the downstream side.

As illustrated in FIG. 4, in a sectional view of the heater 59 and the holder 61, the holder 61 that supports the heater 59 is supported by a frame 62 on the inner peripheral side of the fixing belt 57. The holder 61 supports the heater 59 from the other of the front and back side surfaces (lower surface in FIG. 4). In the above, one of the front and back side surfaces of the heater 59 may be referred to as a heater front surface 591, and the other of the front and back side surfaces may be referred to as a heater back surface 592.

The heater front surface 591 is a heating surface on which the heat source blocks 311 to 319 are disposed under a protective layer (not illustrated). The heater back surface 592 is a heat transfer surface through which the heat of the heat source blocks 311 to 319 is transmitted through the thickness of the heater 59.

The heater 59 is supported in contact with the holder 61 on both sides of the nip upstream side and the nip downstream side. The heater 59 is not in contact with the holder 61 between the nip upstream side and the nip downstream side and prevents heat transfer to the holder 61.

The holder 61 includes a bottom wall portion 71 supported by the frame 62, an upstream side wall portion 72 that stands from the nip upstream side of the bottom wall portion 71, and a downstream side wall portion 73 that stands from the nip downstream side of the bottom wall portion 71. In the cross-sectional view of FIG. 4, the holder 61 has a U-shape in which the bottom wall portion 71, the upstream side wall portion 72, and the downstream side wall portion 73 are integrated. The heater 59 is supported by the holder 61 to be fit between the upstream side wall portion 72 and the downstream side wall portion 73.

The holder 61 includes a first rib (protrusion) 74 that supports the upstream side of the heater 59 on the nip upstream side and also includes a second rib (protrusion) 75 that supports the downstream side of the heater 59 on the nip downstream side. The first rib 74 and the second rib 75 stand on the heater 59 side from the bottom wall portion 71 of the holder 61 to be perpendicular to the front and back surfaces of the heater 59. The standing heights of the first rib 74 and the second rib 75 are lower than the standing heights of the upstream side wall portion 72 and the downstream side wall portion 73. According to the embodiment, the first rib 74 is integrated with the upstream side wall portion 72 of the holder 61, and the second rib 75 is integrated with the downstream side wall portion 73 of the holder 61.

The first rib 74 and the second rib 75 extend in the longitudinal direction (sheet width direction) of the heater 59. The first rib 74 and the second rib 75 extend over the entire length of the heater 59. The first rib 74 and the second rib 75 are in contact with and support the both sides of the nip upstream side and the nip downstream side of the heater back surface 592 from below. Both side edge portions 593 of the heater 59 in the sheet conveyance direction are close to or in contact with the inner wall surfaces of the upstream side wall portion 72 and the downstream side wall portion 73. The heater 59 is fixed to the first rib 74 and the second rib 75 of the holder 61 and the upstream side wall portion 72 and the downstream side wall portion 73.

The holder 61 is separated from the heater back surface 592 between the first rib 74 and the second rib 75. A rib that partially supports the heater back surface 592 and the like may be provided between the first rib 74 and the second rib 75 of the holder 61. The holder 61 may include a portion that avoids the heater back surface 592 between the nip upstream side and the nip downstream side.

The first rib 74 and the second rib 75 configure a support portion 610 that is in contact with the heater back surface 592 and supports the heater 59. The first rib 74 and the second rib 75 are partially cut out in the longitudinal direction of the heater 59. That is, cut-out portions (not illustrated) that are not in contact with the heater back surface 592 are partially formed in the first rib 74 and the second rib 75. Retracting portions (not illustrated) that are not in contact with the heater back surface 592 are not limited to the cut-out portions that are formed in the ribs, and may be holes or recesses that avoid the contact with the heater back surface 592. If the retracting portions are partially provided, the support rigidity of the heater 59 is secured.

Hereinafter, the decoloration method of the image by the image forming apparatus 100 of the embodiment is described.

The sheet S on which the image that can be decolored due to heat is formed is supplied to the sheet storage unit 20 of the image forming apparatus 100. The sheet S is a tag sheet to which the wireless tag T is attached. For example, a sheet SA on which the image is formed as illustrated in FIG. 5 is supplied to the sheet storage unit 20.

Figure 5:
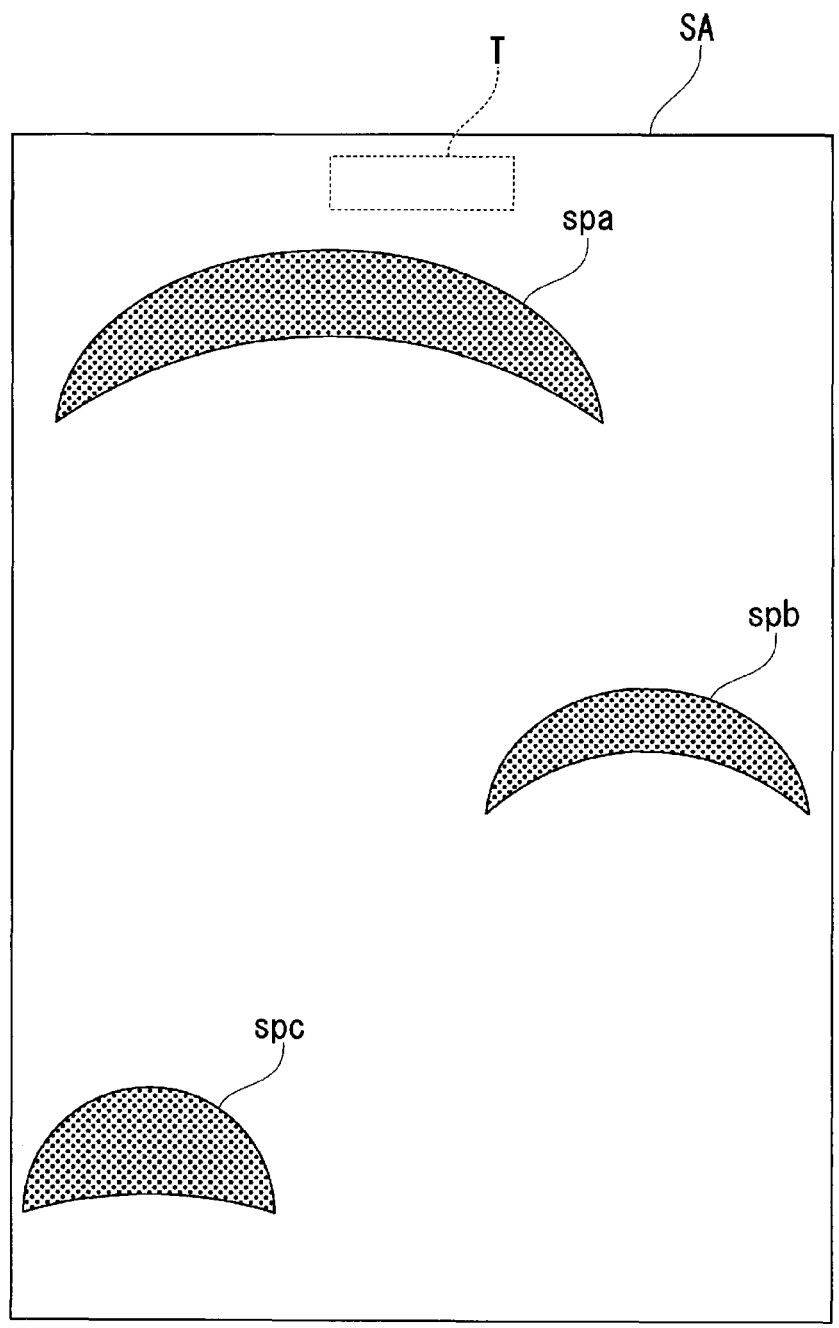
FIG. 5 is a diagram illustrating an example of a sheet supplied to the image forming apparatus.

FIG. 5 is a diagram illustrating an example of the sheet S supplied to the image forming apparatus 100 of the embodiment. As illustrated in FIG. 5, images illustrating three figures (figures spa, spb, and spc) are respectively formed on the sheet SA. All of the respective images illustrating the figures spa, spb, and spc are images formed with recording material (for example, a decolorable toner) that can be decolored by heating.

The image forming apparatus 100 divides the entire sheet S into a plurality of areas, manages information for each area, and performs a process (hereinafter, referred to as a "decoloration process") relating to decoloration. For example, the image forming apparatus 100 divides the entire sheet SA into a plurality of areas (hereinafter, referred to as divided areas) as illustrated in FIG. 6 and manages the information.

Figure 6:
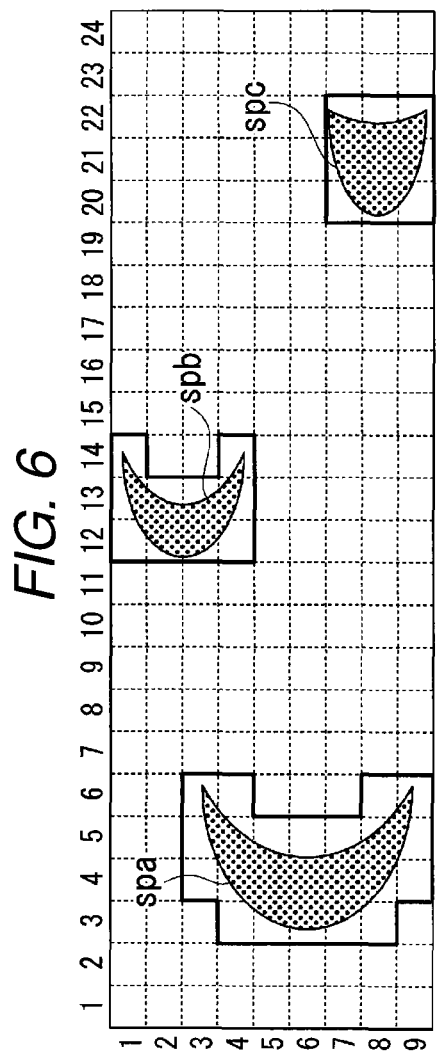
FIG. 6 is a schematic view illustrating management for each divided area by the image forming apparatus.

FIG. 6 is a schematic view illustrating management for each divided area by the image forming apparatus 100 of the embodiment. As illustrated in FIG. 6, the image forming apparatus 100 divides the sheet SA into 216 divided areas in total with 9 rows×24 columns and manages information. In the following description, the area corresponding to the M-th row and the N-th column is described as (M, N).

If the image formed on the sheet SA is decolored, the image forming apparatus 100 does not heat the entire sheet S to decolor the image, but heats only a divided area including the image to decolor the image. For example, in case of the sheet SA illustrated in FIG. 6, divided areas including the image illustrating the figure spa are (3,4), (3,5), (3,6), (4,3), (4,4), (4,5), (4,6), (5,3), (5,4), (5,5), (6,3), (6,4), (6,5), (7,3), (7,4), (7,5), (8,3), (8,4), (8,5), (8,6), (9,4), (9,5), and (9,6).

Therefore, reduction in power consumption in the image forming apparatus 100 can be achieved by heating only the divided areas in which the image is formed. Generally, due to the characteristics of the sheet, the number of times decoloration can be performed by heating the same location of a sheet is limited. According to the present embodiment, the maximum value of the number of times of capable of performing decoloration by heating the same location of the sheet S is set to 10 times. If only areas in which the image is formed become decoloration targets, the increase of the number of times of decoloration in each divided area of the sheet S can be prevented, and thus the sheet S can be effectively utilized.

Figure 7:
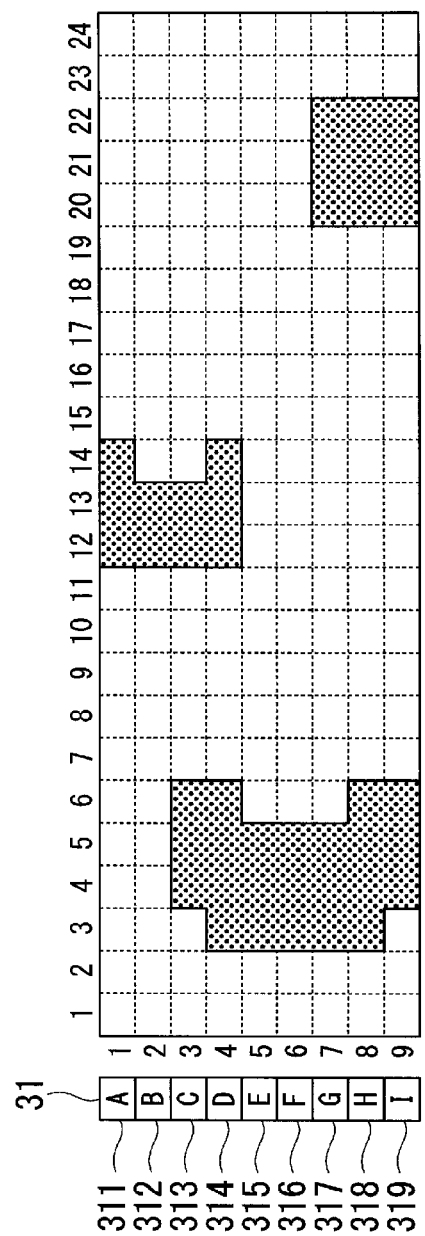
FIG. 7 is a schematic view illustrating a heating process on the sheet by the image forming apparatus.

FIG. 7 is a schematic view illustrating a heating process on the sheet S by the image forming apparatus 100 of the embodiment. As illustrated in FIG. 7, the image forming apparatus 100 can perform the heating process on the sheet SA by using the heat source block group 31 of the nine blocks (the heat source blocks 311 to 319). As such, the number of heat source blocks included in the image forming apparatus 100 corresponds to the number of rows of the divided area (9 rows).

The heat source block group 31 is included in the fixing device 30. The fixing device 30 also functions as a decoloration device. The fixing device 30 appropriately heats each of the heat source blocks 311 to 319 to heat the fixing belt 57. The fixing device 30 can heat desired divided areas by pressing the sheet S against the heated fixing belt 57 with the pressure roller 58. Accordingly, the image formed on the sheet S is decolored.

For example, the fixing device 30 can heat a divided area on the third row (for example, a divided area of (3,4)) by heating the heat source block 313. As a method of heating a divided area on a desired column by the fixing device 30, the following method is considered. For example, a configuration in which only when the sheet S is conveyed to the fixing device 30, and the divided area as a heating target is located at a position of the pressure roller 58, the pressure roller 58 presses the sheet S may be possible. Otherwise, for example, a configuration in which only when the sheet S is conveyed to the fixing device 30, and the divided area as a heating target is located at a position of the pressure roller 58, the fixing belt 57 is controlled to be in a heated state may be possible.

The image forming apparatus 100 manages the number of times of performing decoloration for each divided area of the sheet S. The information (hereinafter, referred to as "history information") indicating the number of times of performing decoloration on each divided area of the sheet S in the past is stored in advance in the wireless tag T attached to the sheet S. The history information may have a configuration of being stored, for example, in an external device such as a server. If the image formed on the sheet S is decolored, the image forming apparatus 100 updates a value of the history information. The image forming apparatus 100 performs addition to a value of history information corresponding to the divided area in which the decoloration is performed.

FIG. 8 is a schematic view illustrating an update of history information by the image forming apparatus 100 of the embodiment. For example, if decoloration is firstly performed on an image formed on the sheet SA illustrated in FIG. 5, at the point before the decoloration is performed, values of the history information in all divided areas are 0 [times]. If three figures (the figures spa, spb, and spc) formed on the sheet SA are decolored, the image forming apparatus 100 performs addition to the values of the history information corresponding to the heated divided areas. As illustrated in FIG. 8, the image forming apparatus 100 adds 1 to the values of the history information corresponding to the heated divided areas and updates the values from "0" to "1".

Subsequently, an image is formed by the image forming apparatus 100 or another image forming apparatus on the above sheet SA on which decoloration is performed by the image forming apparatus 100. For example, the sheet SA as illustrated in FIG. 9 is supplied from the sheet storage unit 20.

Figure 9:
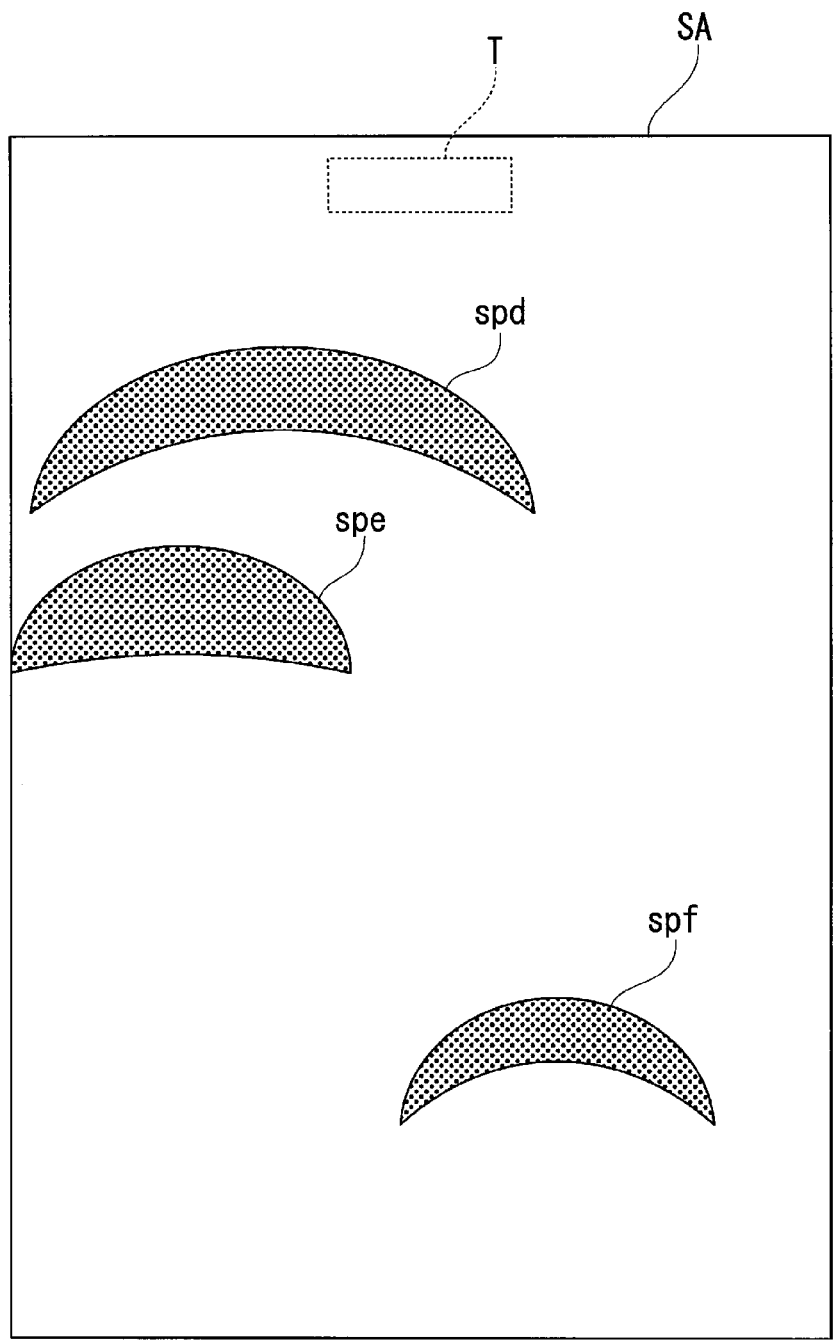
FIG. 9 is a diagram illustrating an example of the sheet supplied to the image forming apparatus.

FIG. 9 is a diagram illustrating an example of the sheet S supplied to the image forming apparatus 100 of the embodiment. As illustrated in FIG. 9, images illustrating three figures (figures spd, spe, and spf) are formed on the sheet SA. All of the respective images illustrating the figures spa, spb, and spc are images formed with a decolorable recording material (for example, a decolorable toner) by heating. As illustrated, positions of images (firstly formed images) formed on the sheet SA illustrated in FIG. 5 and positions of images (secondly formed images) formed on the sheet S illustrated in FIG. 9 are different from each other.

Figure 10:
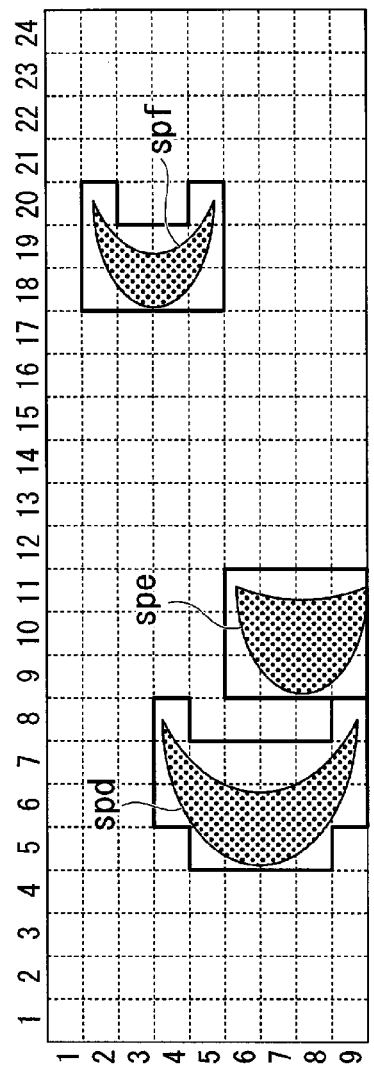
FIG. 10 is a schematic view illustrating the management for each divided area by the image forming apparatus.

FIG. 10 is a schematic view illustrating the management for each divided area by the image forming apparatus 100 of the embodiment. The image forming apparatus 100 heats only the divided area including any images illustrating three figures (the figures spd, spe, and spf) to decolor the corresponding images. For example, in case of the sheet SA illustrated in FIG. 10, areas including the image illustrating the figure spd are (4,6), (4,7), (4,8), (5,5), (5,6), (5,7), (6,5), (6,6), (6,7), (7,5), (7,6), (7,7), (8,5), (8,6), (8,7), (9,6), (9,7), and (9,8).

Figure 11:
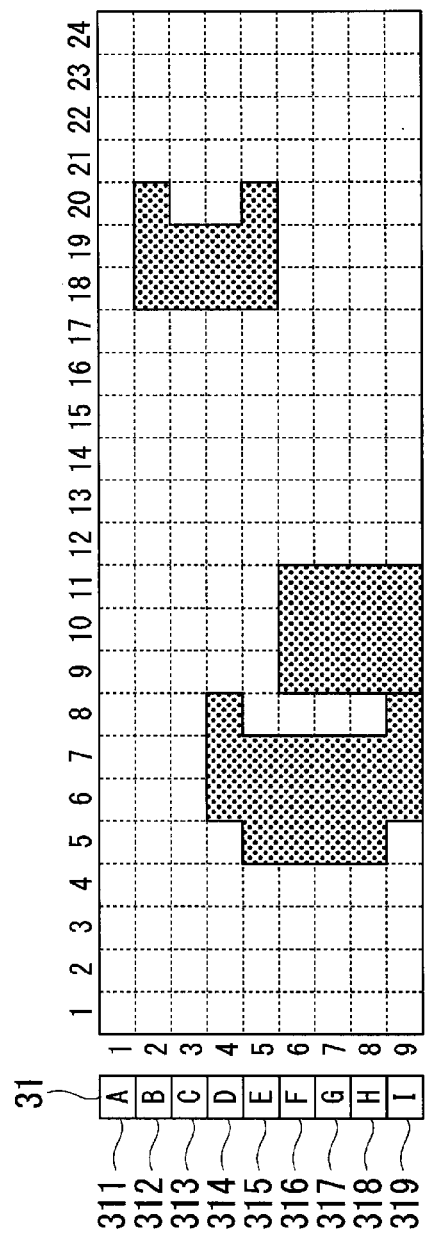
FIG. 11 is a schematic view illustrating a heating process on the sheet by the image forming apparatus.

FIG. 11 is a schematic view illustrating a heating process on the sheet S by the image forming apparatus 100 of the embodiment. The image forming apparatus 100 performs the heating process on the sheet SA by using the heat source block group 31 of nine blocks (the heat source blocks 311 to 319).

The image forming apparatus 100 manages the number of times of performing decoloration for each divided area of the sheet S. The history information is stored in advance in the wireless tag T attached to the sheet S. Specifically, the history information illustrated in FIG. 8 is stored in the wireless tag T attached to the sheet S illustrated in FIG. 9. The image forming apparatus 100 further decolors the images formed on the sheet SA and then updates the history information. The image forming apparatus 100 performs addition to the values of history information corresponding to the divided areas in which the decoloration is performed.

FIG. 12 is a schematic view illustrating an update of history information by the image forming apparatus 100 of the embodiment. For example, if the images formed on the sheet SA illustrated in FIG. 9 are decolored, at the point before the decoloration is performed, the values of the history information corresponding to the divided areas are values illustrated in FIG. 8. If three figures (the figures spd, spe, and spf) formed on the sheet SA are decolored, the image forming apparatus 100 performs addition to the values of the history information corresponding to the heated divided areas. As illustrated in FIG. 12, the image forming apparatus 100 updates the values of the history information corresponding to the heated divided areas to add 1.

As illustrated in FIG. 12, the values of the history information corresponding to the divided areas heated in both processes of the first decoloration and the second decoloration become "2". The values of the history information corresponding to the divided areas heated in any one process of the first decoloration and the second decoloration become "1". As such, the image forming apparatus 100 can manage the number of times of performing decoloration for each divided area.

When receiving an instruction of decoloring the image formed on the sheet S, the image forming apparatus 100 reads the history information stored in the wireless tag T attached to the sheet S. The image forming apparatus 100 reads information (hereinafter, referred to as "area designation information") for designating a divided area to be decolored which is stored in the wireless tag T attached to the sheet S. That is, the divided area to be decolored is an area included in the image formed with a decolorable toner or the like. The area designation information may be stored, for example, in an external device such as a server.

The image forming apparatus 100 refers to the history information corresponding to each divided area to be decolored which is designated based on the area designation information. The image forming apparatus 100 confirms whether there is history information that reaches the maximum value (for example, 10 times) of the number of times of decoloration performed in advance, from the referred history information. If there is history information reaching the maximum value of the number of times of decoloration set in advance, the image forming apparatus 100 discharges the sheet SA without performing the decoloration process on the image formed on the sheet SA. Accordingly, the image forming apparatus 100 can be caused to not perform the decoloration process the number of times of exceeding the maximum value of the number of times of decoloration.

As described above, the image forming apparatus 100 of the present embodiment is configured not to heat the heat source block group 31, if in at least one divided area of the divided areas designated based on the area designation information, the number of times of performing decoloration reaches a predetermined value. Here, the configuration is not limited thereto, and the following configuration may be possible. The image forming apparatus 100 may be configured to cause the heat source block group 31 not to perform heating, if the number of times of performing decoloration reaches the predetermined value in at least one divided area of all the divided areas included in the sheet S. That is, the image forming apparatus 100 may be configured not to perform the decoloration process if there is any one divided area in which the number of times of performing decoloration reaches the predetermined value, regardless of whether the divided area is to be decolored.

Hereinafter, an example of the operation of the image forming apparatus 100 of the embodiment is described.

Figure 13:
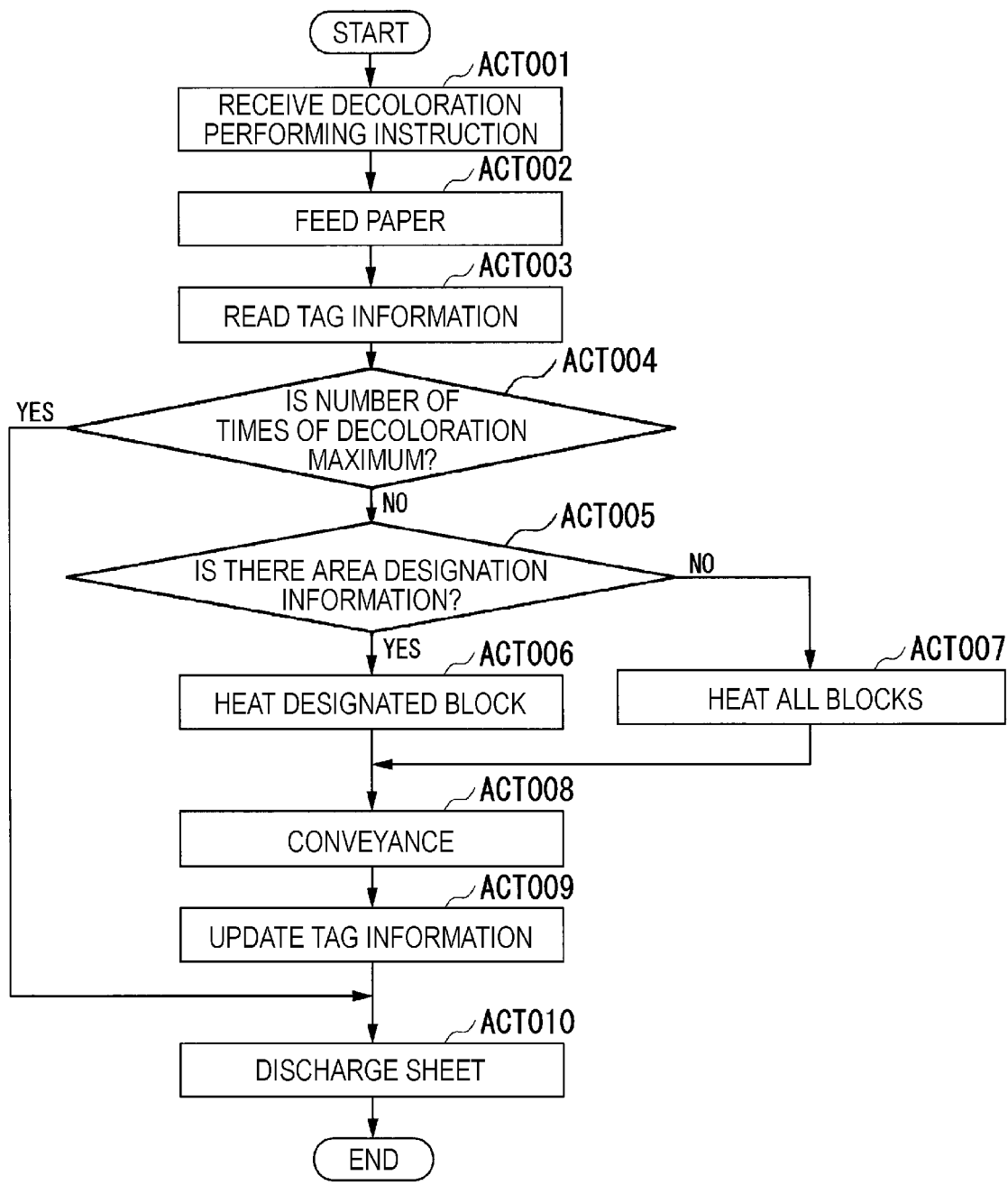
FIG. 13 is a flowchart illustrating an operation of the image forming apparatus.

FIG. 13 is a flowchart illustrating an operation of the image forming apparatus 100 of the embodiment. The present flowchart starts when an instruction of performing decoloration is output to the controller 6 by the image forming apparatus 100.

The instruction of performing decoloration is an instruction for causing the image forming apparatus 100 to decolor an image that is formed on the sheet S and can be decolored by heating. The instruction of performing decoloration is output to the controller 6 if the user designates the decoloration mode with the control panel 8 and performs an operation input for starting the decoloration process. The instruction of performing decoloration may be output to the controller 6 by a user performing an operation input with an external device such as a personal computer.

The controller 6 receives an input of the instruction of performing decoloration (ACT 001). Subsequently, the controller 6 controls the sheet supplying unit 4 and the conveyance unit 5 and supplies the sheet S mounted on the sheet storage unit 20 to the fixing device 30 (ACT 002). The supplied sheet S passes through a portion near the first read and write unit 40 provided at a position to be an entrance of the conveyance unit 5. The first read and write unit 40 (reading unit) detects radio waves transmitted from the wireless tag T attached to the sheet S and reads the information stored in the wireless tag T (ACT 003). At least the history information is included in the information stored in the wireless tag T. The area designation information may be included in the information stored in the wireless tag.

The first read and write unit 40 outputs the read information to the controller 6. The controller 6 stores information obtained from the first read and write unit 40 to the auxiliary storage device 93. If the area designation information is stored in the auxiliary storage device 93, the controller 6 refers to the area designation information and specifies a divided area to be decolored. If the area designation information is not stored in the auxiliary storage device 93, the controller 6 specifies all divided areas of the sheet S to be decolored.

Subsequently, the controller 6 refers to the history information stored in the auxiliary storage device 93 and specifies the number of times of decoloration corresponding to the specified divided areas. Subsequently, if any one of the specified numbers of times of decoloration reaches a predetermined maximum value (Yes in ACT 004), the controller 6 discharges the sheet S to the conveyance unit 5 without performing the decoloration process (ACT 010). In the above, the operation of the image forming apparatus 100 illustrated in the flowchart of FIG. 13 ends.

If all of the specified numbers of times of decoloration do not reach the predetermined maximum value (No in ACT 004), and the area designation information is stored in the auxiliary storage device 93 (Yes in ACT 005), the controller 6 controls the fixing device 30 and heats the heat source block corresponding to the divided areas designated based on the area designation information (ACT 006). Meanwhile, if all of the specified numbers of times of decoloration do not reach the predetermined maximum value (No in ACT 004), and the area designation information is not stored in the auxiliary storage device 93 (No in ACT 005), the controller 6 controls the fixing device 30 and heats all heat source blocks (ACT 007).

The controller 6 controls the conveyance unit 5 and conveys the sheet S on which the image is decolored by heating to the paper discharging tray 7 (ACT 008). The controller 6 outputs the information for performing heating that indicates the heated divided area to the second read and write unit 41. The second read and write unit 41 obtains the information for performing heating output from the controller 6.

The conveyed sheet S passes through a portion near the second read and write unit 41 provided at a position to be an exit of the conveyance unit 5. The second read and write unit 41 detects the radio wave transmitted from the wireless tag T attached to the sheet S. The second read and write unit 41 (updating unit) updates the tag information stored in the wireless tag T (ACT 009). Specifically, the second read and write unit 41 updates the history information by adding 1 to the value of the history information corresponding to the divided area based on the information for performing heating which is obtained from the controller 6.

The conveyance unit 5 discharges the sheet S to the paper discharging tray 7 (ACT 010). Here, the operation of the image forming apparatus 100 illustrated in the flowchart of FIG. 13 ends.

As described above, the image forming apparatus 100 according to the present embodiment manages the number of times of performing decoloration in the past for each divided area of the sheet S. If there is a divided area in which the number of times of performing decoloration in the past reaches a predetermined maximum value, the image forming apparatus 100 does not perform the decoloration process. If there is no divided area of which the number of times of performing decoloration in the past reaches a predetermined maximum value, the image forming apparatus 100 performs a decoloration process. If a decoloration process is performed, the image forming apparatus 100 adds 1 to the value of the number of times corresponding to the divided area heated in the decoloration process. Accordingly, the image forming apparatus 100 can manage the number of times of decoloration in the past without human intervention so that the decoloration process is not performed the number of times exceeding the maximum value.

According to the configuration as above, the image forming apparatus 100 according to the present embodiment can decolor the image and update the tag information in a series of operations. Accordingly, the image forming apparatus 100 can easily increase the consistency between the image formed on the tag sheet and the tag information.

The functions of the image forming apparatus 100 according to the embodiment may be realized by a computer. Here, the functions may be realized by recording programs for realizing these functions in a computer-readable recording medium and causing a computer system to read and execute the programs recorded in this recording medium. The "computer system" mentioned herein includes an OS and hardware such as peripheral devices. The "computer-readable recording medium" refers to a portable medium such as a flexible disk, a magneto-optical disk, a ROM, a CD-ROM, or a storage device such as a hard disk built in a computer system. The "computer-readable recording medium" may include a recording medium that maintains a program dynamically for a short period of time like a communication line if the program is transmitted via a network such as the Internet or a communication line such as a telephone line and a recording medium that maintains a program for a certain period of time like a volatile memory inside a computer system that serves as a server or a client in that case. The program may be a program for realizing some of the functions described above or may be a program that can realize the functions described above in combination with a program already recorded in the computer system.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a reading component configured to read area designation information for designating an area to be decolored in areas of a sheet on which an image that can be decolored by heating is formed and history information for indicating a number of times of performing decoloration previously for each area of the sheet from a wireless tag attached to the sheet;
    a heater configured to heat the area based on the area designation information read by the reading component; and
    an updating component configured to update the history information stored in the wireless tag which corresponds to the area heated by the heater.

2. The image forming apparatus according to claim 1, wherein
    if in at least one of the areas based on the area designation information, the number of times of performing decoloration corresponding to the area reaches a predetermined value, the heater does not heat the sheet.

3. The image forming apparatus according to claim 1, wherein
    if in at least one area of all the areas of the sheet, the number of times of performing decoloration corresponding to the area reaches a predetermined value, the heater does not heat the sheet.

4. The image forming apparatus according to claim 1, wherein
    if the area designation information is not stored in the wireless tag, the heater heats all of the areas of the sheet.

5. The image forming apparatus according to claim 1, further comprising a fixing device comprising the heater.

6. The image forming apparatus according to claim 1, wherein the heater is further configured to heat the area at a temperature higher than an image forming temperature.

7. The image forming apparatus according to claim 1, wherein the history information comprises divided areas previously heated.

8. A decoloration device, comprising:
    a reading component configured to read area designation information for designating an area to be decolored in areas of a sheet on which an image that can be decolored by heating is formed and history information for indicating a number of times of performing decoloration previously for each area of the sheet from a wireless tag attached to the sheet;
    a heater configured to heat the area based on the area designation information read by the reading component; and an updating component configured to update the history information stored in the wireless tag which corresponds to the area heated by the heater.

9. The decoloration device according to claim 8, wherein if in at least one of the areas based on the area designation information, the number of times of performing decoloration corresponding to the area reaches a predetermined value, the heater does not heat the sheet.

10. The decoloration device according to claim 8, wherein if in at least one area of all the areas of the sheet, the number of times of performing decoloration corresponding to the area reaches a predetermined value, the heater does not heat the sheet.

11. The decoloration device according to claim 8, wherein if the area designation information is not stored in the wireless tag, the heater heats all of the areas of the sheet.

12. The decoloration device according to claim 8, further comprising a fixing device comprising the heater.

13. The decoloration device according to claim 8, wherein the heater is further configured to heat the area at a temperature higher than an image forming temperature.

14. The decoloration device according to claim 8, wherein the history information comprises divided areas previously heated.

15. A decoloration method, comprising:
reading area designation information for designating an area to be decolored in areas of a sheet on which an image that can be decolored by heating is formed and history information for indicating a number of times of performing decoloration previously for each area of the sheet from a wireless tag attached to the sheet;
heating the area based on the read area designation information; and
updating the history information stored in the wireless tag which corresponds to the heated area.

16. The decoloration method according to claim 15, further comprising
if in at least one of the areas based on the area designation information, the number of times of performing decoloration corresponding to the area reaches a predetermined value, not heating the sheet.

17. The decoloration method according to claim 15, further comprising
if in at least one area of all the areas of the sheet, the number of times of performing decoloration corresponding to the area reaches a predetermined value, not heating the sheet.

18. The decoloration method according to claim 15, further comprising
if the area designation information is not stored in the wireless tag, heating all of the areas of the sheet.

19. The decoloration method according to claim 15, further comprising heating using a fixing device.

20. The decoloration method according to claim 15, further comprising
heating the area at a temperature higher than an image forming temperature.

* * * * *